Patented Nov. 13, 1945

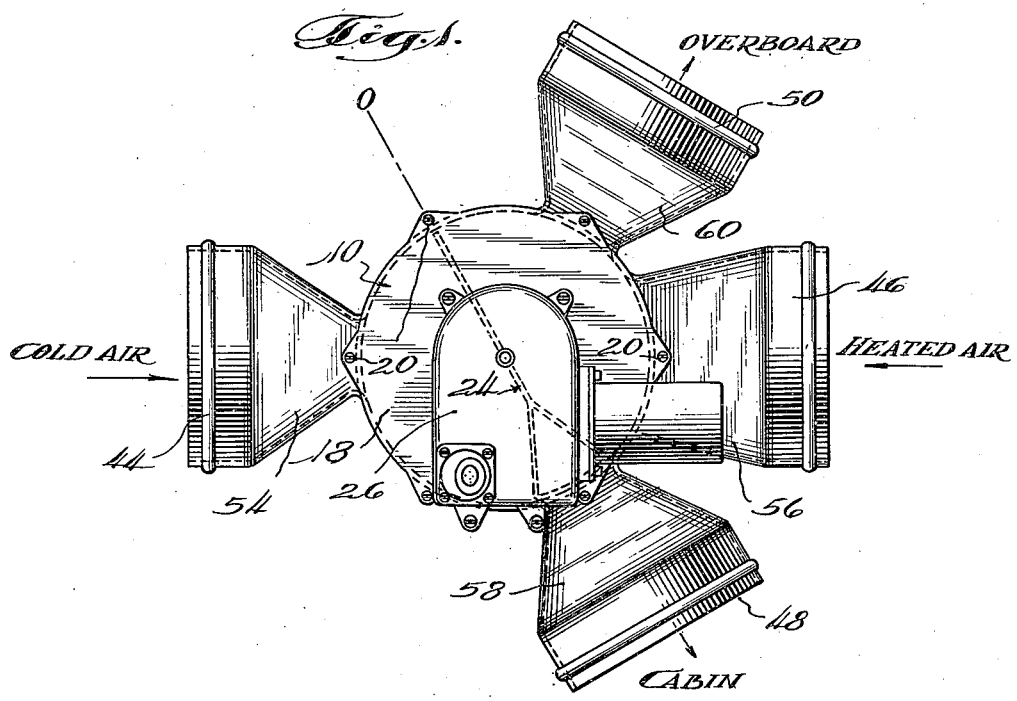

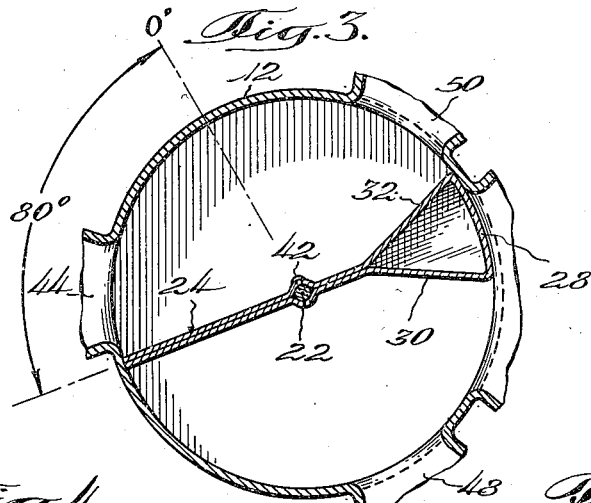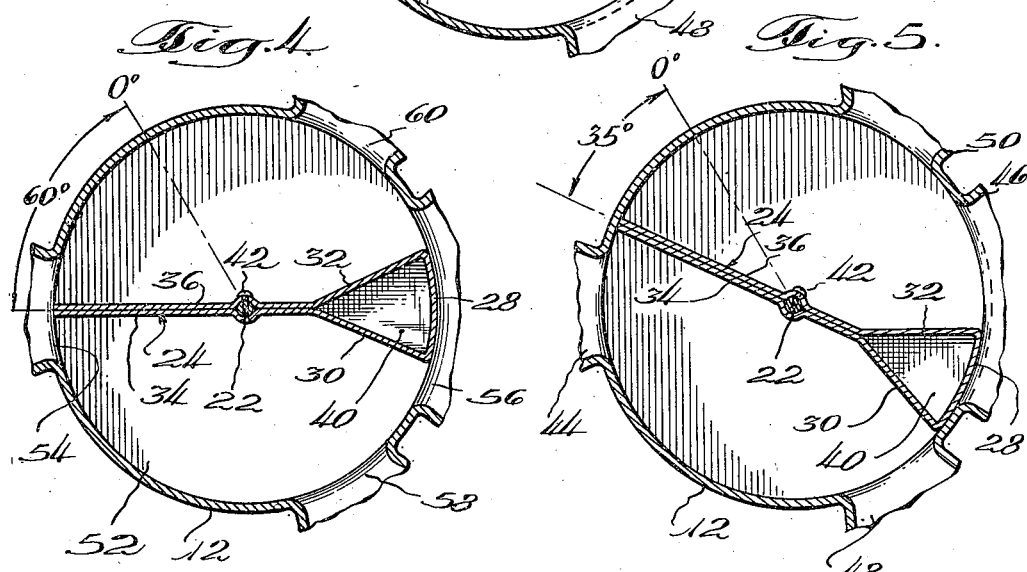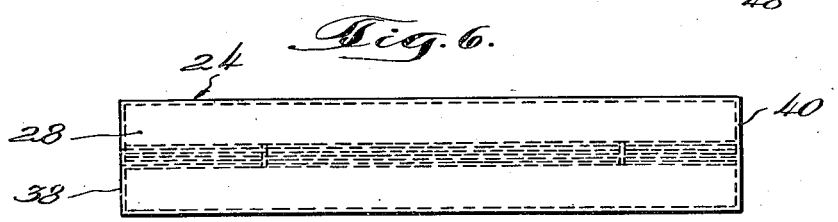

2,388,890

UNITED STATES PATENT OFFICE 2,388,890

FOUR-WAY VALVE

John B. Whitted, Evanston, Ill., assignor to Stewart-Warner Corporation, Chicago, Ill., a corporation of Virginia Application July 27, 1943, Serial No. 496,353

3 Claims. (Cl. 251—108)

My invention relates to four-way valves and is more particularly concerned with, but not limited to, valves for controlling the supply of ventilating air to the cabins or other closed spaces of aircraft.

In present aircraft practice, it is common to provide one or more heaters for heating ventilating air supplied to the cabin or other enclosed spaces in aircraft. With certain types of heaters, failure of the heater to operate properly may result in contaminating the heated ventilating air with large quantities of carbon monoxide gas and it is an object of my invention to provide a valve which may quickly be shifted effectively to prevent appreciable quantities of carbon monoxide from reaching the cabin or other enclosed space before the heater can be shut off or its operation corrected.

Another object of my invention is to provide a simple, light, inexpensive and efficient valve which can be readily adjusted to provide any desired temperature control of the ventilating air for a cabin or other closed space.

Another object of my invention is to provide a new and improved four-way valve affording a maximum variation in the ventilating air with a minimum travel of the movable part of the valve.

Other objects and advantages will become apparent as the description proceeds.

In the drawings:

Fig. 1 is an end view of a preferred form of four-way valve embodying my invention, showing an electric control mechanism applied thereto for shifting the movable element or vane of the valve. In this figure the vane is shown in position to seal the cabin against air discharged by the heater;

Fig. 2 is a side elevation of Fig. 1 viewed from the right of that figure;

Fig. 3 is a sectional view of the valve showing the vane in position to direct heated, ventilating air to the cabin;

Fig. 4 is a view similar to Fig. 3, but showing the vane in position to admit a mixture of heated and cold air to the cabin;

Fig. 5 is another view similar to Fig. 3, but showing the vane in position to admit only cold air to the cabin; and Fig. 6 is an end view of the large end of the movable vane.

The preferred form of my invention shown in the drawings comprises a valve body 10 formed of a die casting, or in any other suitable manner. The body 10 has a generally cylindrical portion 12 closed at one end by an integral part 14 of the casting 10. The other end of the cylindrical body 12 is provided with integral brackets 16 to which a cover plate 18 is secured by screws 20, or in any other suitable manner. A shaft 22 is rotatably mounted in the body 10 and carries a movable element or vane 24 for rotation therewith. In the particular embodiment shown in the drawings, this shaft 22 and vane 24 are shifted to any desired position by an electric control mechanism 26 of the type disclosed and claimed in my co-pending application, Serial No. 499,336, filed August 20, 1943, although any other suitable means may be provided for shifting the shaft 22 and vane 24.

As more clearly shown in Figs. 3, 4, 5 and 6, the vane 24 may be formed of a single strip of sheet metal bent to provide a curved sealing portion 28, inclined portions 30 and 32, and parallel portions 34 and 36. The same piece of sheet metal may also include triangular sides 38 and 40 integral with one of the inclined portions and bent inwardly, as shown in Fig. 6, and the free edges welded or soldered to the other inclined portion and rounded sealing portion. While it is convenient and inexpensive to make the vane of a single piece of sheet metal, this vane may be made in any other suitable manner and is shown as being attached to its supporting shaft by screws 42.

The valve body 10 is provided with a cold air inlet 44 adapted to be attached to a pipe leading from a ram or other suitable source of atmospheric air. This cold air inlet 44 is co-axial with a heated air inlet 46 which is adapted to be connected directly to the ventilating air outlet of a heater or to a pipe connected to the ventilating air outlet of one or more heaters. For convenience, the common axis of the cold air inlet 44 and the heated air inlet 46 will be referred to as the major axis of the valve.

The body 10 is also provided with a cabin outlet 48 adapted to be connected with a pipe for conducting ventilating air to the aircraft cabin or other space or spaces to which such air is to be supplied. This cabin outlet 48 has a center line located at an angle of 60° from the major axis of the heater, measured in a clockwise direction. The body 10 is also provided with an overboard or discharge outlet 50 adapted to be connected with a pipe leading to atmosphere. This overboard outlet has a center line located at a 60° angle from the major axis of the heater, measured in a counterclockwise direction.

The inlets 44 and 46 and outlets 48 and 50 project radially from the cylindrical portion of the body 10 and terminate in pipe-like ends which may be readily attached to connecting piping. In the drawings, these pipe-like ends are all shown as being of the same diameter, although any other suitable sizes and shapes of ends may be utilized as desired. The inlets 44 and 46 and outlets 48 and 50 communicate with the central valve chamber 52 by way of elongated ports 54, 56, 58 and 60, respectively. The port 58 is of such width that this port is completely sealed by the rounded end 28 of the vane 24 when this vane is in the position shown in Fig. 1 and this size relationship is important, since it effectively prevents any air discharged by the heater from entering the cabin when the vane is in this position.

On the other hand, the port 56 is necessarily much wider than the rounded end of the vane 24 and I have found it convenient to make this port 56 approximately twice the width of the port 58. The ports 54 and 60 are illustrated as being of substantially the same width as the port 58, although the exact width of the ports 54 and 60 is not critical, as these ports are never closed by the curved end 28 of the vane and the width of the ports 54 and 60 may vary within limits hereinafter explained.

When it is desired to supply no ventilating air to the cabin or other space and most effectively to protect this cabin or space against carbon monoxide gases issuing from the aircraft heater, the vane 24 is shifted to the position shown in Fig. 1. In this position the air from the heater is discharged overboard, since the heated air inlet 46 is in open communication with the overboard outlet 50. At the same time the port 58, which connects the cabin outlet 48 with the central valve chamber 52, is completely sealed by the rounded end 28 of the vane 24 so that a double protection is provided against the entry of contaminated air into the aircraft cabin. Since the air from the aircraft heater is in free communication with atmosphere through the overboard outlet 50, there is no heated air under pressure in chamber 52 to create leakage around the curved end of the vane and into the cabin port 58.

If it is desired to admit only atmospheric air to the cabin, the vane 24 is rotated in a counter-clockwise direction through an angle of 35° from the position shown in Fig. 1 to that shown in Fig. 5. In this position of the vane, the cold air inlet 44 is in open communication with the cabin outlet 48 and any air given off by the heater is discharged overboard, since the heated air inlet 46 is in open communication with the overboard outlet 50.

When it is desired to temper the atmospheric air with air from the aircraft heater, the vane 24 may be moved in a counterclockwise direction through another 25° to the position shown in Fig. 4. In this position, one end of the vane 24 bisects the cold air inlet port 54 so that half of this air flows to the cabin and the other half is discharged overboard. The other end of the vane 24 also bisects the heated air port 56, so that half of the heated air flows to the cabin and the other half is discharged overboard. This position of the vane 24 indicates the importance of having the heated air port 56 wider than the rounded end of the vane.

Further movement of the vane in a counterclockwise direction through an additional 20° brings the vane to the position shown in Fig. 3, where only heated air is supplied to the cabin and all cold air supplied by the ram is discharged overboard. This position of the vane 24 constitutes one limit of its travel, whereas the position shown in Fig. 1 constitutes the other limit of its travel. The vane, therefore, need only be shifted through an angle of 80° to provide perfect and complete control of the cabin ventilation. It is to be understood that the position shown in Fig. 4 is not the only position of the vane for supplying a mixture of cold and heated air to the cabin. The vane may be shifted in either direction from the position shown in Fig. 4 to supply any desired ratio of cold and heated air to the cabin to provide any desired temperature conditions therein.

This Fig. 4 indicates quite clearly the preferred relationship between the widths of the ports 54 and 56 and the widths of the narrow end and rounded end of the vane 24. These elements are preferably so made that whenever the rounded end of the vane divides the air between the overboard outlet and the cabin outlet, the opposite or thin edge of the vane should divide the cold air in inverse proportions between the overboard and cabin outlets. The particular position of the overboard port shown in the drawings is not critical, as this part could be shifted in a counter-clockwise direction until the lefthand edge of this port would be just to the right of the thin edge of the vane when the latter is in the position shown in Fig. 1. Such a shift in the position of the port 60 would not change the operation of the valve. Similarly, the width of this port could be increased in a counter-clockwise direction to the same extent without changing the operation of the valve.

Various other changes and modifications could be made without departing from the scope of my invention, and it is to be understood that my invention includes all modifications, variations and equivalents coming within the scope of the appended claims.

I claim:

1. A four-way valve of the class described, comprising a body having a cylindrical chamber therein, an inlet port for connecting said chamber with a source of cold air, a heated air inlet port for said chamber substantially co-axial with said cold air inlet port, said heated air inlet port being substantially wider in a circumferential direction than said cold air inlet port, a cabin outlet port positioned at an angle to the axis of said heated air port, a discharge port having an axis located at an angle to the axis of said heated air port, said discharge port and cabin outlet port being arranged on opposite sides of said heated air port, a light weight, inexpensive vane rotatable in said body and having opposite ends closely adjacent the wall of said cylindrical chamber, said vane being formed of sheet metal and having a narrow end and a broad end adapted completely to close said cabin outlet port, and means for shifting said vane to different positions in said body to variably regulate flow through said ports.

2. A four-way valve of the class described, comprising a body having a cylindrical chamber therein, an inlet port for connecting said chamber with a source of cold air, a heated air inlet port for said chamber substantially co-axial with said cold air inlet port, said heated air inlet port being substantially twice as wide in a circumferential direction as said cold air inlet port, a cabin outlet port positioned at an angle to the axis of said heated air port, a discharge port having an axis located at an angle to the axis of said heated air port, said discharge port and cabin outlet port being arranged on opposite sides of said heated air port and having substantially the same width as said cold air inlet port, a light weight, inexpensive vane rotatable in said body and having opposite ends closely adjacent the wall of said cylindrical chamber, one of said ends being narrow and the other being of hollow rounded construction and of suitable width completely to close said cabin outlet port, and means for shifting said vane to different positions in said body to variably regulate flow through said ports.

3. A four-way valve of the class described, comprising a body having a cylindrical chamber therein, a first port for said chamber, a second port for said chamber substantially co-axial with said first port, said second port being substantially twice as wide in a circumferential direction as said first port, a third port positioned at an angle to the axis of said second port, a fourth port having an axis located at an angle to the axis of said second port, said fourth port and third port being arranged on opposite sides of said second port and having substantially the same width as said first port, a light weight, inexpensive vane rotatable in said body, said vane being formed of reversely bent sheet metal and having opposite ends closely adjacent the wall of said cylindrical chamber, one of said ends being rounded and of suitable width completely to close said third port, said ports being unequally spaced about said cylindrical chamber and said second port being wider than said rounded end, and means for shifting said vane to different positions in said body to variably regulate flow through said ports.

JOHN B. WHITTED.